United States Patent
Edamadaka et al.

(10) Patent No.: US 11,838,247 B2
(45) Date of Patent: Dec. 5, 2023

(54) METHOD AND SYSTEM FOR INTERACTION SERVICING

(71) Applicant: JPMorgan Chase Bank, N.A., New York, NY (US)

(72) Inventors: Rajeshwari Edamadaka, Allentown, NJ (US); Diarmuid Leonard, Galway (IE); David A. Butler, Philadelphia, PA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 401 days.

(21) Appl. No.: 17/089,275

(22) Filed: Nov. 4, 2020

(65) Prior Publication Data

US 2021/0383439 A1    Dec. 9, 2021

Related U.S. Application Data

(60) Provisional application No. 63/036,752, filed on Jun. 9, 2020.

(51) Int. Cl.
*H04L 51/046* (2022.01)
*H04L 45/121* (2022.01)
(Continued)

(52) U.S. Cl.
CPC .............. *H04L 51/046* (2013.01); *G06F 7/08* (2013.01); *G06F 8/70* (2013.01); *G06F 9/451* (2018.02);
(Continued)

(58) Field of Classification Search
CPC ... H04L 51/046; H04L 9/0869; H04L 9/3242; H04L 45/121; H04L 67/14; H04L 67/55; H04L 67/562; H04L 67/564; H04L 67/63; H04L 51/234; H04L 51/214; H04L 51/56; H04L 51/18; G06F 7/08; G06F 8/70; G06F 9/451; G06F 9/4881; G06F 9/505;
(Continued)

(56) References Cited

U.S. PATENT DOCUMENTS 5,999,908 A * 12/1999 Abelow ............. G06Q 30/0203
                                                          434/118
6,021,428 A *  2/2000 Miloslavsky ........... H04M 3/51
                                                         348/E7.083
(Continued)

*Primary Examiner* — Lisa Hashem
(74) *Attorney, Agent, or Firm* — GREENBLUM & BERNSTEIN, P.L.C.

(57) ABSTRACT

A system and a method for servicing user interactions are provided. The method includes: receiving, from each respective user, a respective request for a corresponding interaction; obtaining, for each interaction, request-specific information that relates to the received respective request and user-specific information that relates to the respective user; analyzing the request-specific information to determine at least one corresponding microservice that is usable for handling the interaction; and routing the request-specific information and the user-specific information to a respective destination that relates to the determined microservice. For any particular interaction, several corresponding microservices and several corresponding routes and destinations may be determined, and workload distribution metrics may be used to select optimum routes.

20 Claims, 11 Drawing Sheets

(51) Int. Cl.

| | |
|---|---|
| *G06Q 10/10* | (2023.01) |
| *G06F 11/14* | (2006.01) |
| *G06F 9/48* | (2006.01) |
| *G06Q 30/016* | (2023.01) |
| *G06F 9/54* | (2006.01) |
| *G06F 9/451* | (2018.01) |
| *G06F 8/70* | (2018.01) |
| *G09G 5/377* | (2006.01) |
| *H04M 3/51* | (2006.01) |
| *G06F 9/50* | (2006.01) |
| *G06F 7/08* | (2006.01) |
| *G06F 11/36* | (2006.01) |
| *H04M 3/42* | (2006.01) |
| *H04M 7/00* | (2006.01) |
| *G06Q 10/04* | (2023.01) |
| *G06Q 30/02* | (2023.01) |
| *H04L 9/08* | (2006.01) |
| *H04L 9/32* | (2006.01) |
| *H04L 67/14* | (2022.01) |
| *H04L 67/55* | (2022.01) |
| *H04L 67/63* | (2022.01) |
| *H04L 67/562* | (2022.01) |
| *H04L 67/564* | (2022.01) |
| *H04M 3/436* | (2006.01) |
| *H04M 3/50* | (2006.01) |
| *G06Q 10/20* | (2023.01) |

(52) U.S. Cl.
CPC ............ *G06F 9/4881* (2013.01); *G06F 9/505* (2013.01); *G06F 9/5072* (2013.01); *G06F 9/5077* (2013.01); *G06F 9/5083* (2013.01); *G06F 9/542* (2013.01); *G06F 9/546* (2013.01); *G06F 9/547* (2013.01); *G06F 11/1464* (2013.01); *G06F 11/3612* (2013.01); *G06Q 10/04* (2013.01); *G06Q 10/103* (2013.01); *G06Q 30/016* (2013.01); *G06Q 30/0281* (2013.01); *G09G 5/377* (2013.01); *H04L 9/0869* (2013.01); *H04L 9/3242* (2013.01); *H04L 45/121* (2013.01); *H04L 67/14* (2013.01); *H04L 67/55* (2022.05); *H04L 67/562* (2022.05); *H04L 67/564* (2022.05); *H04L 67/63* (2022.05); *H04M 3/42042* (2013.01); *H04M 3/4365* (2013.01); *H04M 3/50* (2013.01); *H04M 3/5183* (2013.01); *H04M 3/5191* (2013.01); *H04M 7/0054* (2013.01); *G06F 2201/805* (2013.01); *G06F 2209/503* (2013.01); *G06F 2209/505* (2013.01); *G06F 2209/508* (2013.01); *G06Q 10/20* (2013.01); *G09G 2354/00* (2013.01)

(58) Field of Classification Search
CPC .... G06F 9/5072; G06F 9/5077; G06F 9/5083; G06F 9/542; G06F 9/546; G06F 9/547; G06F 11/1464; G06F 11/3612; G06F 2201/805; G06F 2209/503; G06F 2209/505; G06F 2209/508; G06F 2209/5011; G06F 9/5033; G06F 3/147; G06F 2209/547; G06Q 10/04; G06Q 10/103; G06Q 30/016; G06Q 30/0281; G06Q 10/20; G09G 5/377; G09G 2354/00; H04M 3/42042; H04M 3/4365; H04M 3/50; H04M 3/5183; H04M 3/5191; H04M 7/0054
See application file for complete search history.

(56) References Cited

U.S. PATENT DOCUMENTS

| | | | |
|---|---|---|---|
| 6,389,400 B1* | 5/2002 | Bushey | G06Q 30/02 |
| | | | 705/7.29 |
| 6,574,605 B1* | 6/2003 | Sanders | G06Q 10/1097 |
| | | | 379/265.06 |
| 6,850,613 B2* | 2/2005 | McPartlan | H04M 3/5232 |
| | | | 379/265.02 |
| 8,401,886 B2* | 3/2013 | Khetarpal | G06F 8/65 |
| | | | 705/7.29 |
| 9,665,387 B2* | 5/2017 | Adogla | G06F 9/45533 |
| 10,148,819 B2* | 12/2018 | Yokel | H04M 3/5191 |
| 10,382,370 B1* | 8/2019 | Labarre | H04L 51/214 |
| 10,560,579 B1* | 2/2020 | Wu | H04M 3/5233 |
| 10,764,126 B2* | 9/2020 | Kumar | H04L 67/10 |
| 2003/0074342 A1* | 4/2003 | Curtis | G06Q 10/10 |
| 2004/0208309 A1* | 10/2004 | Miloslavsky | H04L 65/403 |
| | | | 348/E7.083 |
| 2006/0002540 A1* | 1/2006 | Kreiner | H04M 3/5233 |
| | | | 379/265.06 |

* cited by examiner

METHOD AND SYSTEM FOR INTERACTION SERVICING

CROSS-REFERENCE TO RELATED APPLICATIONS

This application claims the benefit of U.S. Provisional Patent Application Ser. No. 63/036,752, filed Jun. 9, 2020, which is hereby incorporated by reference in its entirety.

This application is being filed concurrently on Nov. 4, 2020 with each of U.S. patent application Ser. No. 17/089,275, entitled "Method and System for Interaction Servicing"; U.S. patent application Ser. No. 17/089,305, entitled "Method and System for Interaction Servicing with Embeddable Ribbon Display"; U.S. patent application Ser. No. 17/089,302, entitled "Method and System for Resolving Producer and Consumer Affinities in Interaction Servicing"; U.S. patent application Ser. No. 17/089,311, entitled "Method and System for Providing Resiliency in Interaction Servicing"; U.S. patent application Ser. No. 17/089,061, entitled "Method and System for Providing Resiliency in Interaction Servicing Across Data Centers"; U.S. patent application Ser. No. 17/089,093, entitled "Method and System for Providing Resiliency in Interaction Servicing Across Data Centers"; and U.S. patent application Ser. No. 17/089,145, entitled "Method and System for Providing High Efficiency, Bidirectional Messaging for Low Latency Applications," the contents of each of which is hereby incorporated by reference in its respective entirety.

BACKGROUND

1. Field of the Disclosure

This technology generally relates to methods and systems for performing customer service interactions, and more particularly to methods and systems for integrating and streamlining large number of customer service interactions to ensure efficient and accurate interaction servicing results.

2. Background Information

For a large corporate organization that has many customers, customer service is an important aspect of the business operation. Customers typically expect service requests to be handled in a timely and accurate manner, and if the corporate organization fails to provide such customer service, there may be a negative effect on the reputation of that organization.

Many customer service requests are performed online via the Internet. For such requests, it is important that the request be assessed and routed to the correct entity within the corporate organization, together with all of the relevant information that will be needed by the entity that will handle the request. However, the proper routing and handling of such requests may be complicated when the number of requests is large and the size of the corporate organization is large.

Accordingly, there is a need for a tool that integrates and streamlines the processing of customer service interactions in order to ensure efficient and accurate handling and resolution thereof.

SUMMARY

The present disclosure, through one or more of its various aspects, embodiments, and/or specific features or sub-components, provides, inter alia, various systems, servers, devices, methods, media, programs, and platforms for handling large number of customer service interactions to ensure efficient and accurate interaction servicing results.

According to an aspect of the present disclosure, a method for servicing a plurality of interactions with users is provided. The method is implemented by at least one processor. The method includes: receiving, by the at least one processor from each respective user, a respective request for a corresponding interaction; obtaining, by the at least one processor for each interaction, request-specific information that relates to the received respective request and user-specific information that relates to the respective user, analyzing, by the at least one processor for each interaction, the request-specific information to determine at least two corresponding microservices that are usable for handling the interaction; and routing, by the at least one processor for each interaction, the request-specific information and the user-specific information to a respective destination that relates to at least one of the determined at least two corresponding microservices. The users may include humans and/or machines that are configured to act on behalf of humans.

The method may further include: determining at least two separate routes having at least two different destinations that correspond to the determined at least two corresponding microservices; and using at least one metric that relates to a workload distribution to select an optimum route from among the determined at least two separate routes. The routing may further include using the selected optimum route.

The using of the at least one metric to select an optimum route may include minimizing a number of microservice instances to be used along the selected optimum route.

The routing may further include maintaining an event ordering with respect to the selected optimum route.

When at least one of the determined at least two separate routes becomes unavailable, the method may further include selecting the optimum route from among the determined at least two separate routes that remain available.

The routing may further include avoiding a propagation of redundant events as events flow from ingress to egress.

The method may further include receiving, by the at least one processor, response information that relates to a response to the respective request for the corresponding interaction.

The method may further include displaying, by the at least processor for at least one interaction, a screen that includes at least a subset of the request-specific information, at least a subset of the user-specific information, and status information that relates to a status of the response to the respective request for the at least one interaction.

The method may further include determining, for each interaction, a request type for each respective request, the request type including at least one from among a voice request, an email request, an online chat request, a browser request, and a click-to-call request.

The method may be implemented in a contact center environment. The determined at least two corresponding microservices may include at least two from among a core servicing fabric telephony and agent login microservice, an automated specialist provisioning microservice for orchestration; an automated specialist provisioning microservice for routing; an automated specialist provisioning microservice for recording, an automated specialist provisioning microservice for voicemail; a specialist phone control microservice; and a real-time dashboard for contact center supervisory personnel microservice.

According to another aspect of the present disclosure, a computing apparatus for servicing a plurality of interactions with users is provided. The computing apparatus includes a processor, a memory, and a communication interface coupled to each of the processor and the memory. The processor is configured to: receive, from each respective user via the communication interface, a respective request for a corresponding interaction, obtain, for each interaction, request-specific information that relates to the received respective request and user-specific information that relates to the respective user, analyze, for each interaction, the request-specific information to determine at least two corresponding microservice that are usable for handling the interaction; and route, for each interaction, the request-specific information and the user-specific information to a respective destination that relates to at least one of the determined at least two corresponding microservices.

The processor may be further configured to: determine at least two separate routes having at least two different destinations that correspond to the determined at least two corresponding microservices, use at least one metric that relates to a workload distribution to select an optimum route from among the determined at least two separate routes, and use the selected optimum route for routing the request-specific information and the user-specific information.

The processor may be further configured to minimize a number of microservice instances to be used along the selected optimum route.

The processor may be further configured to maintain an event ordering with respect to the selected optimum route.

Wherein when at least one of the determined at least two separate routes becomes unavailable, the processor may be further configured to select the optimum route from among the determined at least two separate routes that remain available.

The processor may be further configured to avoid a propagation of redundant events as events flow from ingress to egress.

The processor may be further configured to receive response information that relates to a response to the respective request for the corresponding interaction.

The processor may be further configured to display, for at least one interaction, a screen that includes at least a subset of the request-specific information, at least a subset of the user-specific information, and status information that relates to a status of the response to the respective request for the at least one interaction.

The processor may be further configured to determine, for each interaction, a request type for each respective request, the request type including at least one from among a voice request, an email request, an online chat request, a browser request, and a click-to-call request.

The determined at least two corresponding microservices may include at least two from among a core servicing fabric telephony and agent login microservice; an automated specialist provisioning microservice for orchestration; an automated specialist provisioning microservice for routing; an automated specialist provisioning microservice for recording; an automated specialist provisioning microservice for voicemail; a specialist phone control microservice; and a real-time dashboard for supervisory personnel microservice.

According to yet another aspect of the present disclosure, a non-transitory computer readable storage medium storing instructions for servicing a plurality of interactions with users is provided. The storage medium includes executable code which, when executed by at least one processor, causes the at least one processor to: receive, from each respective user, a respective request for a corresponding interaction; obtain, for each interaction, request-specific information that relates to the received respective request and user-specific information that relates to the respective user; analyze, for each interaction, the request-specific information to determine at least one corresponding microservice that is usable for handling the interaction; and route, for each interaction, the request-specific information and the user-specific information to a respective destination that relates to the determined at least one corresponding microservice.

When executed by the at least one processor, the executable code may further cause the at least one processor to receive, from the at least one corresponding microservice, response information that relates to a response to the respective request for the corresponding interaction.

When executed by the at least one processor, the executable code may further cause the at least one processor to display, for at least one interaction, a screen that includes at least a subset of the request-specific information, at least a subset of the user-specific information, and status information that relates to a status of the response to the respective request for the at least one interaction.

When executed by the at least one processor, the executable code may further cause the at least one processor to determine, for each interaction, a request type for each respective request, the request type including at least one from among a voice request, an email request, an online chat request, a browser request, and a click-to-call request.

When executed by the at least one processor, the executable code may further cause the at least one processor to analyze the request-specific information to determine at least two corresponding microservices that are usable for handling the corresponding interaction.

When executed by the at least one processor, the executable code may further cause the at least one processor to: determine at least two separate routes having at least two different destinations that correspond to the determined at least two corresponding microservices; use at least one metric that relates to a workload distribution to select an optimum route from among the determined at least two separate routes; and use the selected optimum route for routing the request-specific information and the user-specific information.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
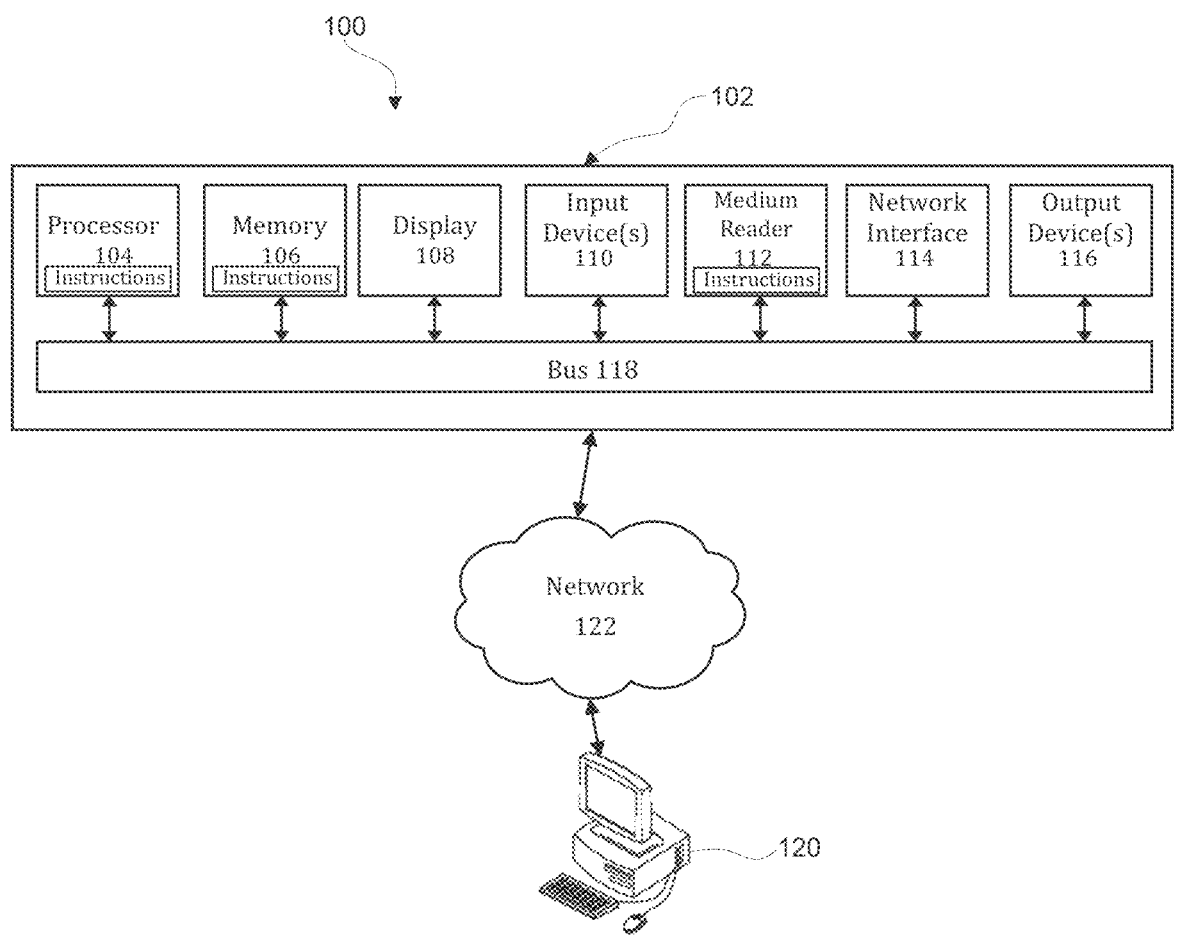
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component Memories described herein are computer-readable mediums from which data and executable instructions can be read by a computer. Memories as described herein may be random access memory (RAM), read only memory (RONI), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the an appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing Virtual computer system processing can be constructed to implement one or more of the methods or functionalities as described herein, and a processor described herein may be used to support a virtual processing environment.

As described herein, various embodiments provide optimized methods and systems for handling large number of customer service interactions to ensure efficient and accurate interaction servicing results.

Figure 2:
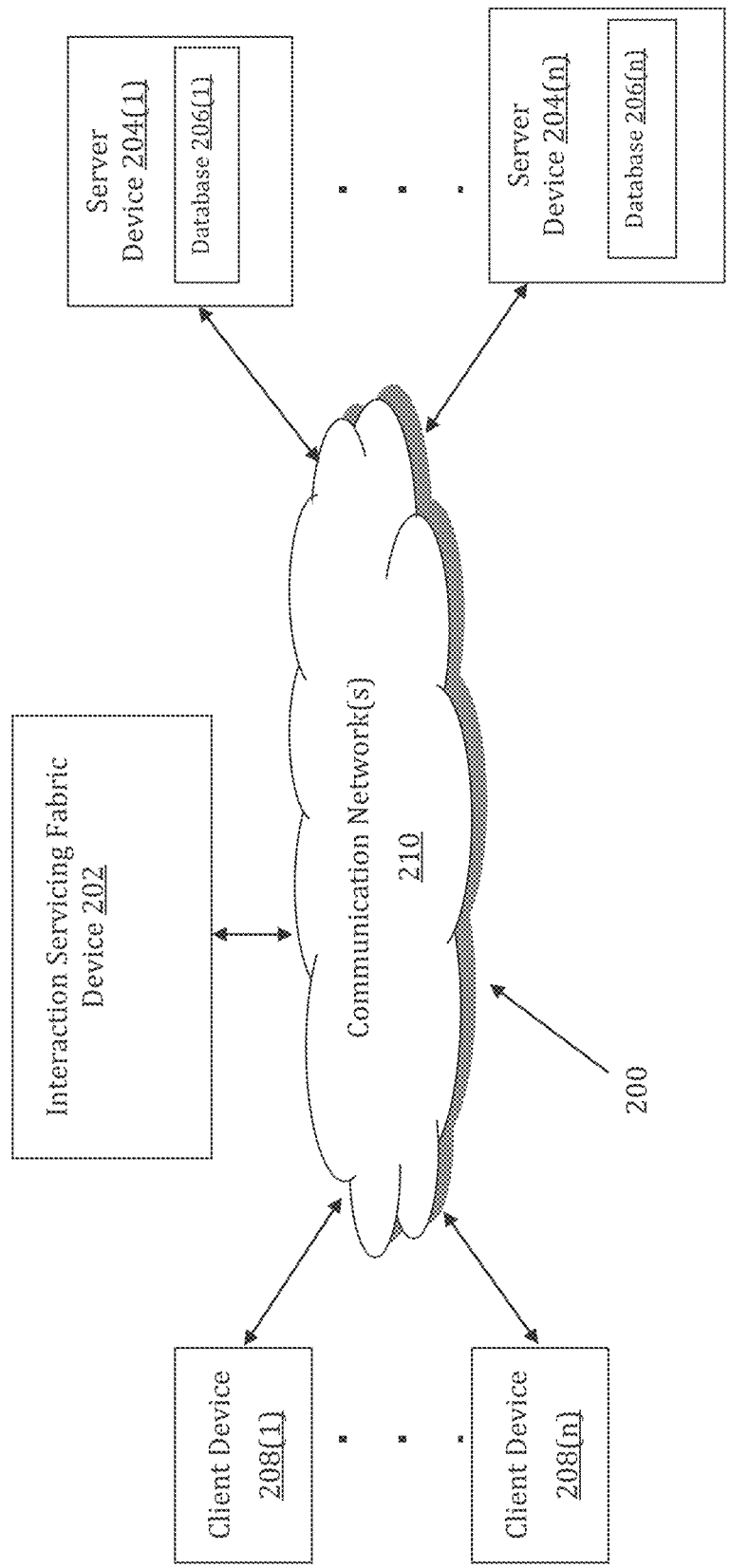
FIG. 2 illustrates an exemplary diagram of a network environment.

Referring to FIG. 2, a schematic of an exemplary network environment 200 for implementing a method for handling large number of customer service interactions to ensure efficient and accurate interaction servicing results is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for handling large number of customer service interactions to ensure efficient and accurate interaction servicing results may be implemented by an Interaction Servicing Fabric (ISF) device 202. The ISF device 202 may be the same or similar to the computer system 102 as described with respect to FIG. 1. The ISF device 202 may store one or more applications that can include executable instructions that, when executed by the ISF device 202, cause the ISF device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ISF device 202 itself, may be located in virtual server(s) running in a cloud-based computing environment rather than being tied to one or more specific physical network computing devices. Also, the application(s) may be running in one or more virtual machines (VMs) executing on the ISF device 202. Additionally, in one or more embodiments of this technology, virtual machine(s) running on the ISF device 202 may be managed or supervised by a hypervisor.

In the network environment 200 of FIG. 2, the ISF device 202 is coupled to a plurality of server devices 204(1)-204(n) that hosts a plurality of databases 206(1)-206(n), and also to a plurality of client devices 208(1)-208(n) via communication network(s) 210. A communication interface of the ISF device 202, such as the network interface 114 of the computer system 102 of FIG. 1, operatively couples and communicates between the ISF device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ISF device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ISF devices that efficiently implement methods and systems for handling large number of customer service interactions to ensure efficient and accurate interaction servicing results.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ISF device 202 may be a standalone device or integrated with one or more other devices or apparatuses, such as one or more of the server devices 204(1)-204(n), for example. In one particular example, the ISF device 202 may include or be hosted by one of the server devices 204(1)-204(n), and other arrangements are also possible. Moreover, one or more of the devices of the ISF device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ISF device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to user requests, identification information that relates to individual users, and microservices that are used for resolving user requests.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ISF device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ISF device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ISF device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ISF device 202, the server devices 204(1)-204(n), or the client devices 208(1)-208(n), for example, may be configured to operate as virtual instances on the same physical machine. In other words, one or more of the ISF device 202, the server devices 204(1)-204(n), or the client devices 208(1)-208(n) may operate on the same physical device rather than as separate devices communicating through communication network(s) 210. Additionally, there may be more or fewer ISF devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
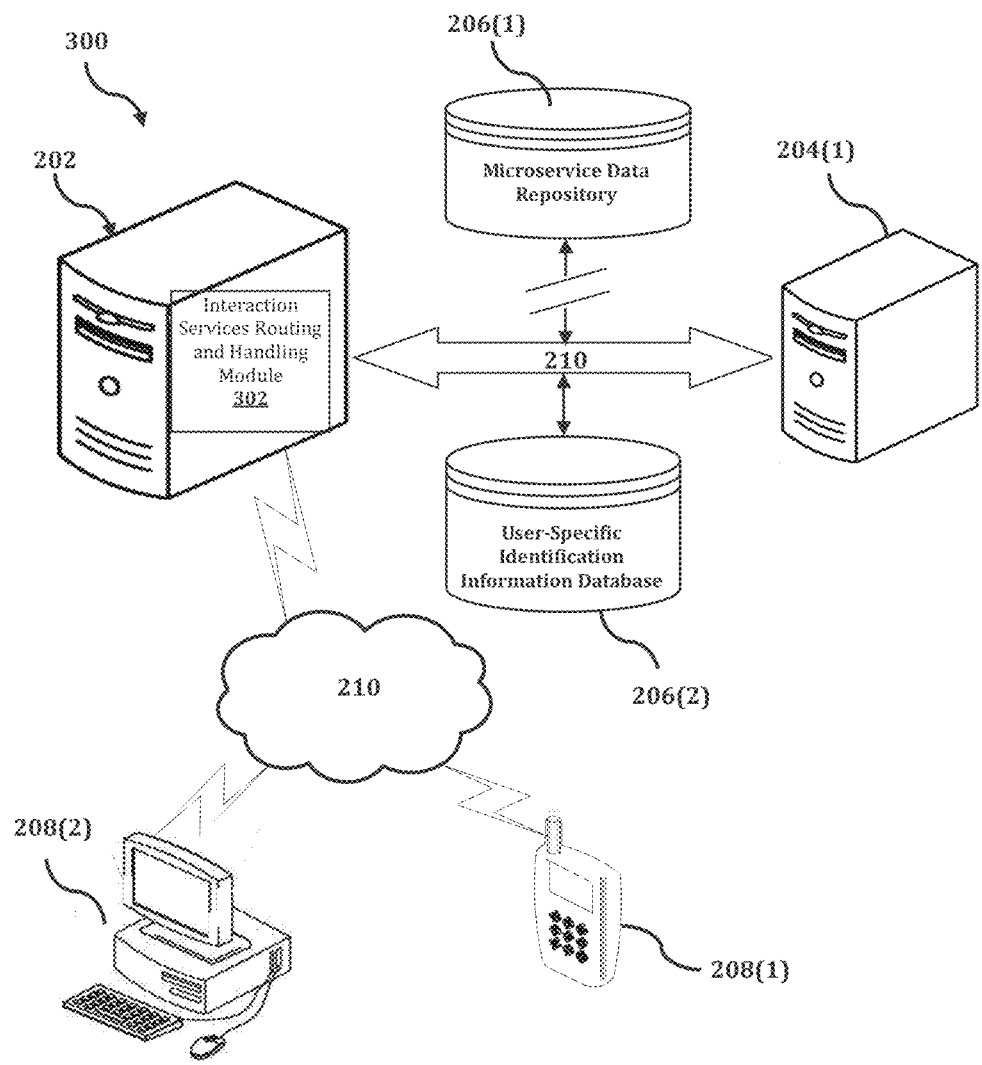
FIG. 3 shows an exemplary system for implementing a method for handling large number of customer service interactions to ensure efficient and accurate interaction servicing results.

The ISF device 202 is described and illustrated in FIG. 3 as including an interaction services routing and handling module 302, although it may include other rules, policies, modules, databases, or applications, for example. As will be described below, the interaction services routing and handling module 302 is configured to implement a method for handling large number of customer service interactions to ensure efficient and accurate interaction servicing results.

An exemplary process 300 for implementing a mechanism for handling large number of customer service interactions to ensure efficient and accurate interaction servicing results by utilizing the network environment of FIG. 2 is illustrated as being executed in FIG. 3. Specifically, a first client device 208(1) and a second client device 208(2) are illustrated as being in communication with ISF device 202. In this regard, the first client device 208(1) and the second client device 208(2) may be "clients" of the ISF device 202 and are described herein as such. Nevertheless, it is to be known and understood that the first client device 208(1) and/or the second client device 208(2) need not necessarily be "clients" of the ISF device 202, or any entity described in association therewith herein.

Any additional or alternative relationship may exist between either or both of the first client device 208(1) and the second client device 208(2) and the ISF device 202, or no relationship may exist. For example, the ISF device 202 and the first client device 208(1) may be configured as the same physical device.

Further, ISF device 202 is illustrated as being able to access a microservice data repository 206(1) and a user-specific identification information database 206(2) The interaction services routing and handling module 302 may be configured to access these databases for implementing a method for handling large number of customer service interactions to ensure efficient and accurate interaction servicing results.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ISF device 202 via broadband or cellular communication. Alternatively, the process may be executed by the ISF device 202 in a standalone manner, e.g., by a smart phone on which the interaction services routing and handling module 302 has been downloaded. Of course, these embodiments are merely exemplary and are not limiting or exhaustive.

Upon being started, a processor that is hosted in the ISF device 202 executes a process for handling large number of customer service interactions to ensure efficient and accurate interaction servicing results. An exemplary process for handling large number of customer service interactions to ensure efficient and accurate interaction servicing results is generally indicated at flowchart 400 in FIG. 4.

Figure 4:
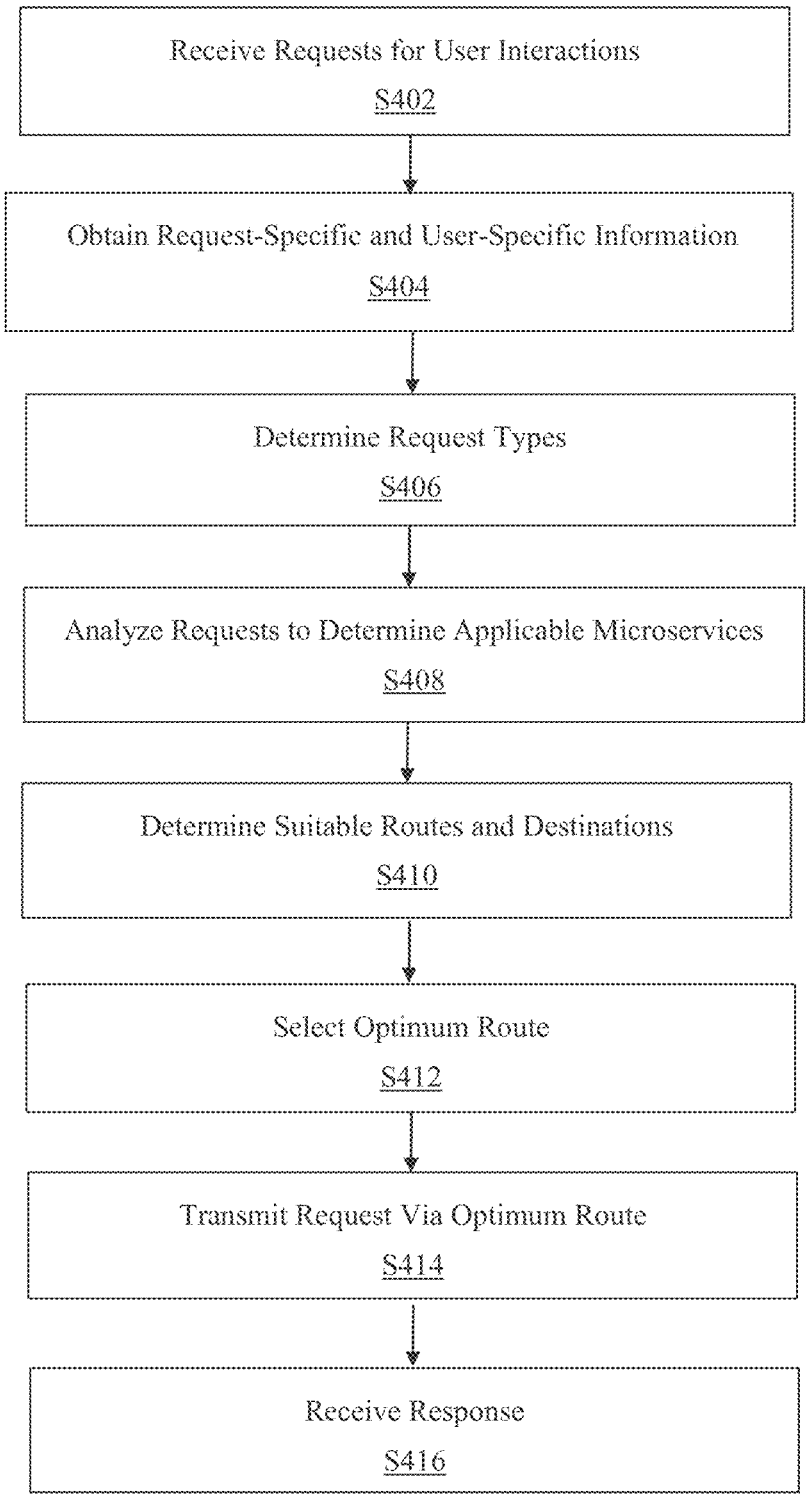
FIG. 4 is a flowchart of an exemplary process for implementing a method for handling large number of customer service interactions to ensure efficient and accurate interaction servicing results.

In process 400 of FIG. 4, at step S402, the interaction services routing and handling module 302 receives, from each of a plurality of users, a respective request for a corresponding interaction. At step S404, the interaction services routing and handling module 302 obtains request-specific information that relates to each respective request and user-specific information that relates to each respective user. In an exemplary embodiment, the interaction services routing and handling module 302 prompts each user to enter the user-specific information via a graphical user interface that is displayed on the screen of a client device 208.

Figure 5:
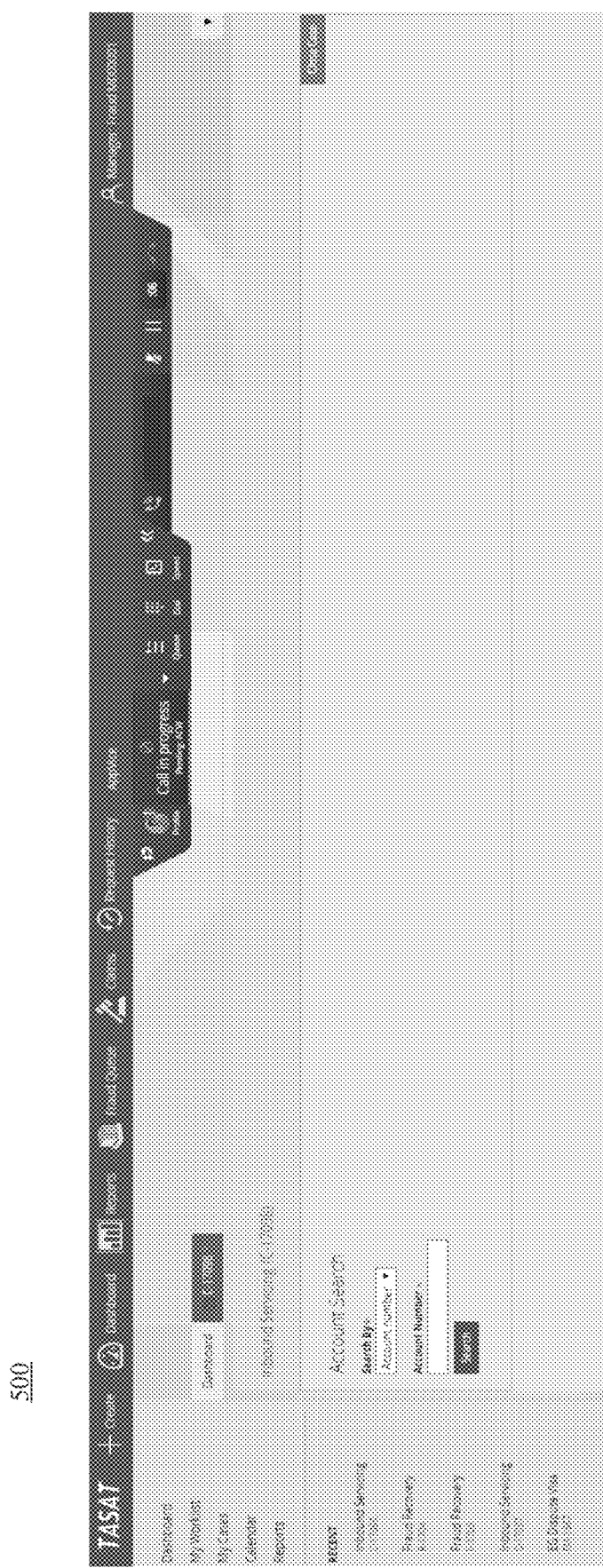
FIG. 5 is a first screenshot that illustrates a user interface for handling a customer interaction, according to an exemplary embodiment.
Figure 6:
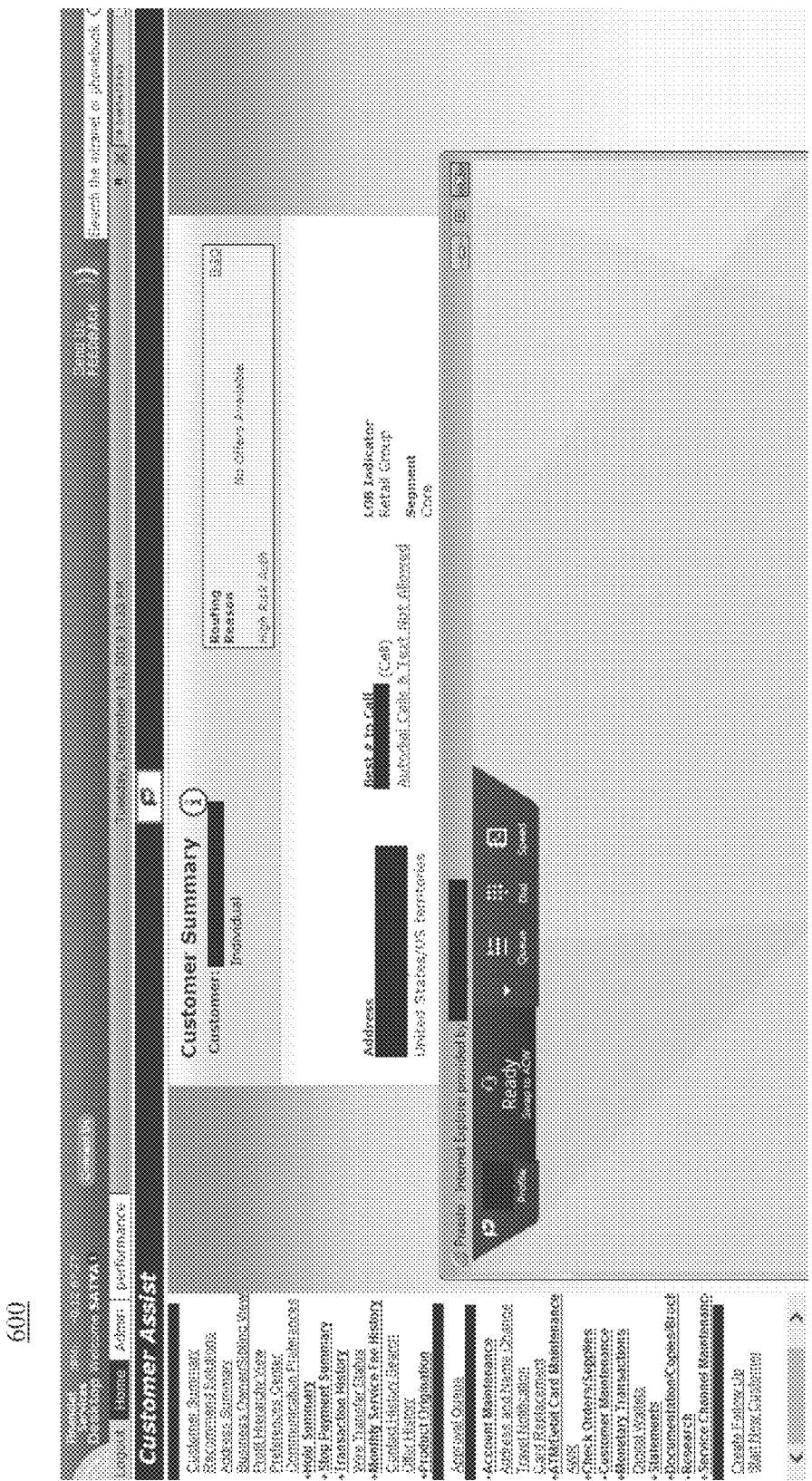
FIG. 6 is a second screenshot that illustrates customer identification information that is displayable on the user interface for handling a customer interaction, according to an exemplary embodiment.

Further, the interaction services routing and handling module 302 may also display, on a screen of the IDF device 202, a user interface for handling an interaction request that includes at least a subset of the request-specific information and at least a subset of the user-specific information. For example, referring to FIG. 5, a first screenshot 500 that illustrates a user interface for handling a customer interaction may include a task bar at the top of the screen, a trapezoidal-shaped ribbon that includes request-specific information and user-specific information at the top right-hand portion of the screen, a menu and a list of recent interactions along the left side of the screen, and status information relating to the current interaction request in the body of the screen. As another example, referring to FIG. 6, a second screenshot 600 that illustrates the user interface may include more details of the user-specific information, together with the trapezoidal-shaped ribbon shown in FIG. 5.

At step S406, the interaction services routing and handling module 302 determines, for each interaction, a request type for each respective request. The request type may indicate a communication mode by which a particular request is received. In an exemplary embodiment, the request type may include at least one of a voice request, an email request, an online chat request, a browser request, and a click-to-call request.

At step S408, the interaction services routing and handling module 302 analyzes, for each requested interaction, the request-specific information in order to determine at least one corresponding microservice and/or at least one microservice instance that is usable for handling the interaction. In an exemplary embodiment, the interaction services routing and handling module may determine more than one such microservice. For example, there may be any number of microservices that are suitable for handling different aspects of an interaction, such as two (2), three (3), five (5), ten (10), twenty (20), fifty (50), one hundred (100), or more such microservices; and some of these may have overlapping functions. As another example, there may be multiple microservice instances, which refers to using one particular microservice multiple times.

At step S410, the interaction services routing and handling module 302 determines at least one suitable route for transmitting the request-specific information and the user-specific information for each respective interaction to a respective destination that relates to the microservices determined in step S408. In an exemplary embodiment, for any given interaction, there may be more than one suitable route and more than one suitable destination, depending on the microservices to be used, and also depending on the order of using the microservices. As a result, the interaction services routing and handling module 302 may determine two or more suitable routes and/or two or more suitable destinations for a particular interaction. Then, at step S412, the interaction services routing and handling module 302 uses a metric that relates to workload distribution for selecting an optimum route; and at step S414, the interaction services routing and handling module 302 uses the optimum route for routing the information.

Figure 7:
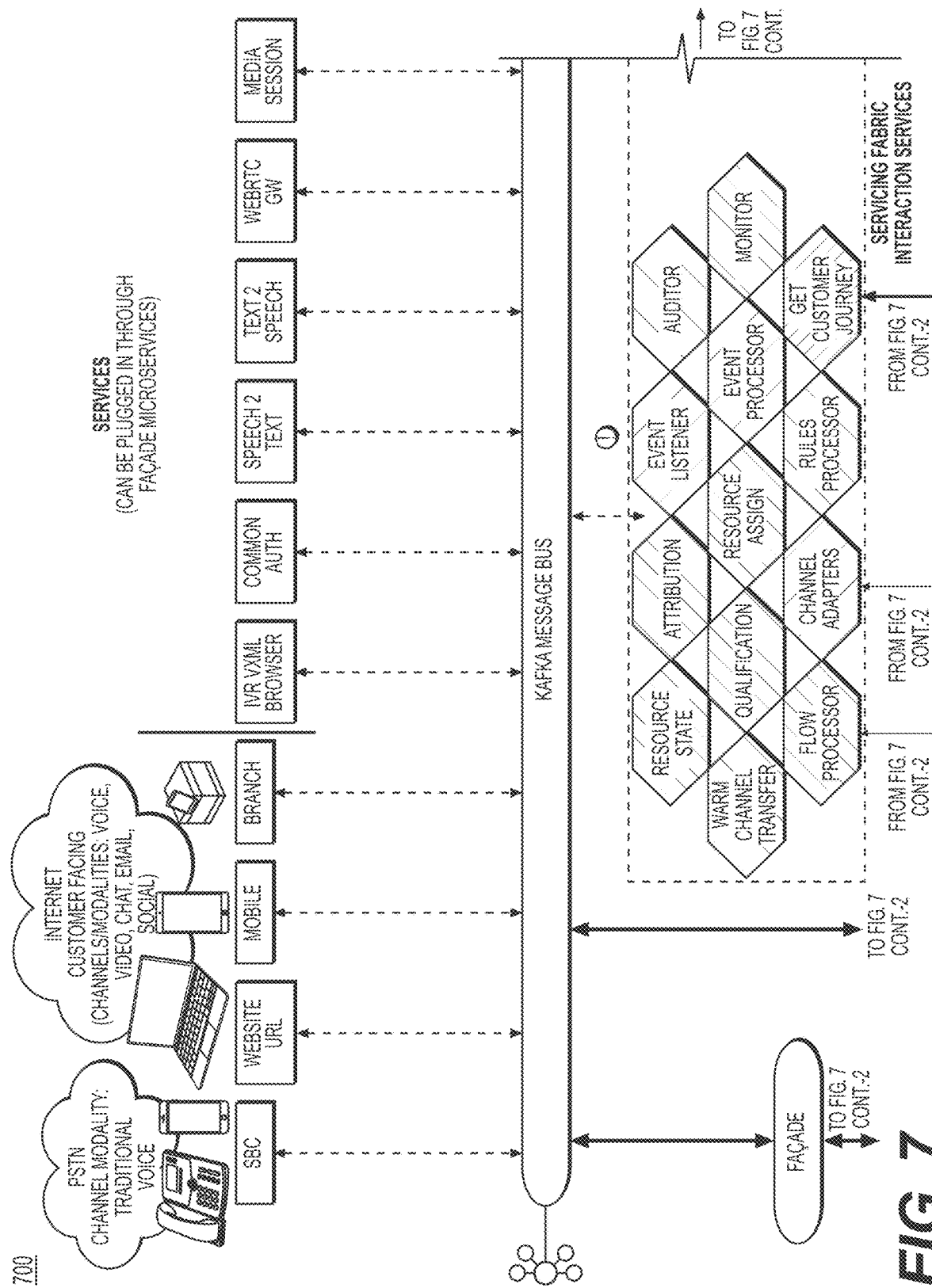
FIG. 7 is a diagram that illustrates a plurality of microservices and corresponding routing paths for implementing a method for handling large number of customer service interactions to ensure efficient and accurate interaction servicing results, according to an exemplary embodiment.
Figure 7:
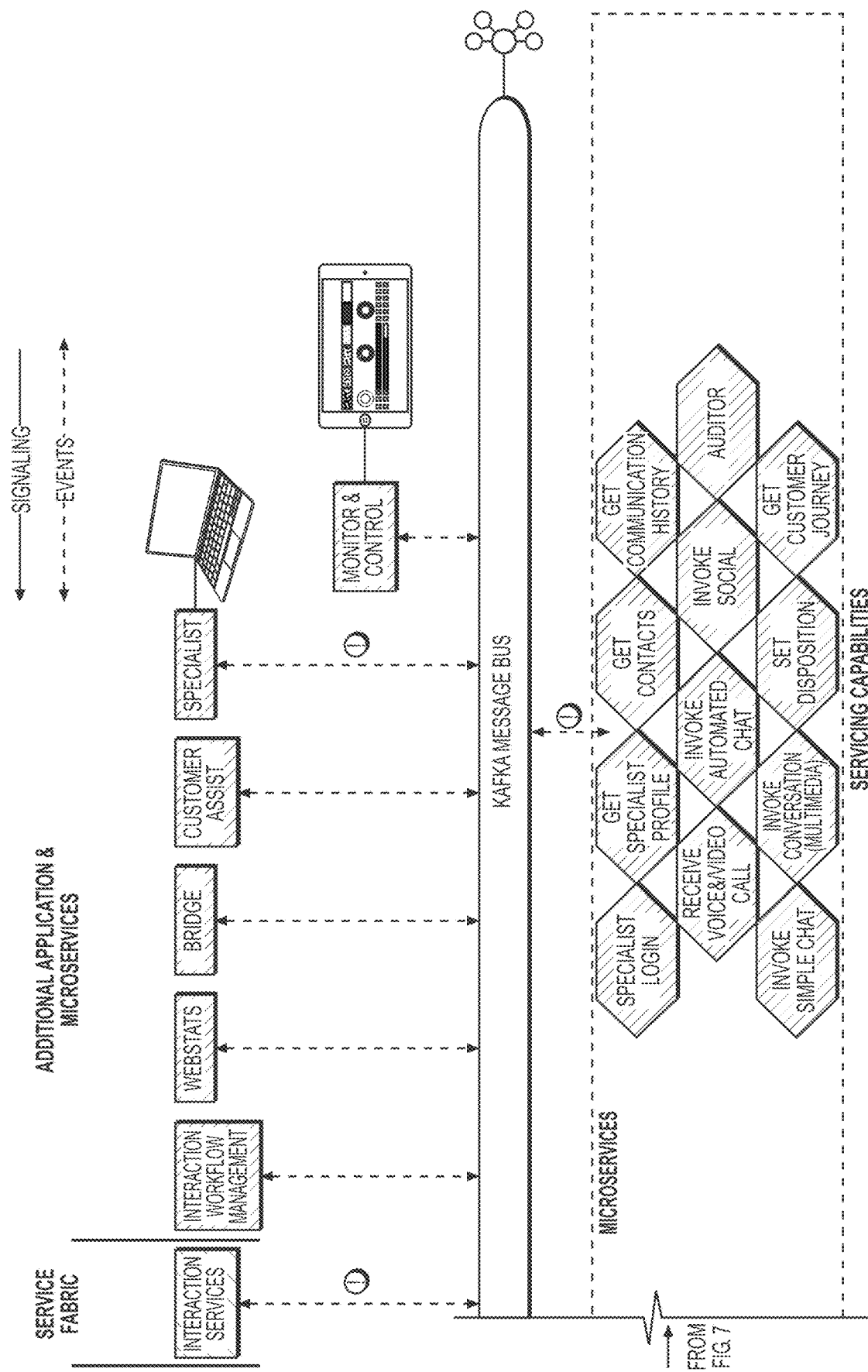
Figure 7:
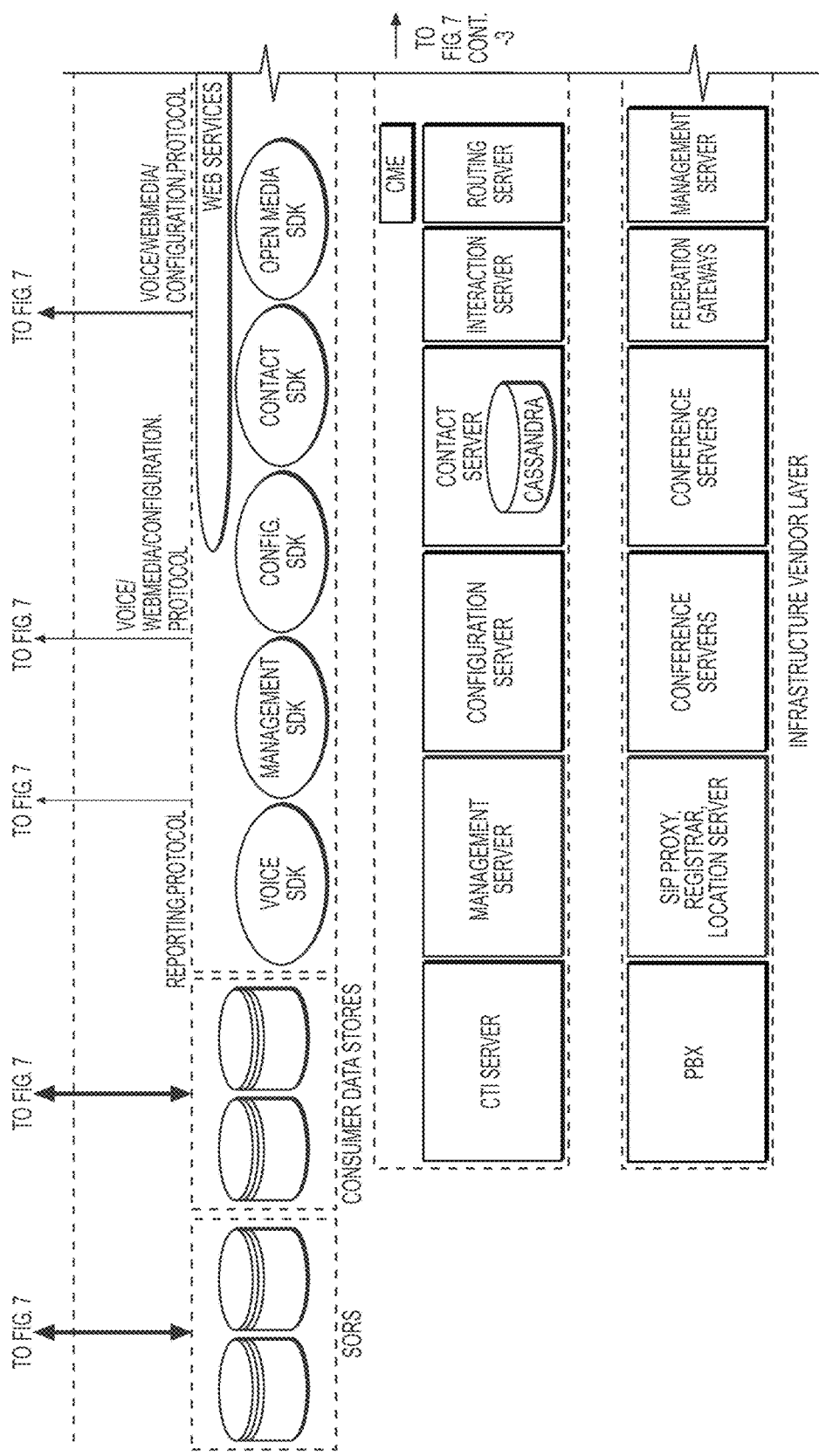
Figure 7:
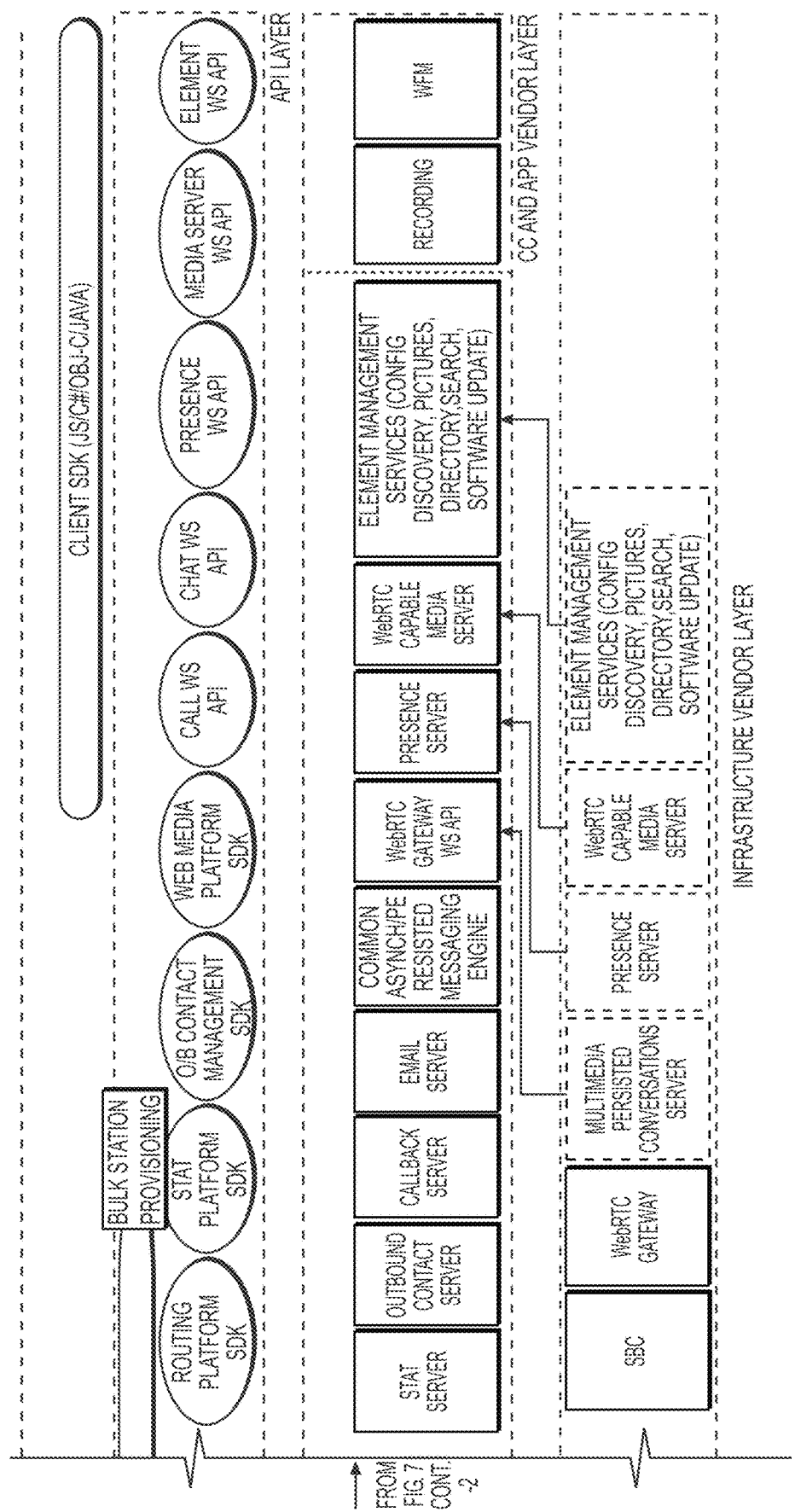

FIG. 7 is a diagram 700 that illustrates a plurality of microservices and corresponding routing paths for implementing a method for handling large number of customer service interactions to ensure efficient and accurate interaction servicing results, according to an exemplary embodiment. As illustrated in FIG. 7, a large number of microservices may be available for handling a particular request with respect to an interaction, including microservices having the following descriptors. "resource state"; "attribution"; "event listener"; "auditor"; "warm channel transfer"; "qualification"; "resource assign"; "event processor"; "monitor". "flow processor"; "channel adapters"; "rules processor"; "get customer journey"; "specialist login"; "get specialist profile"; "get contacts", "get communication history", "receive voice & video call"; "invoke automated chat"; "invoke social"; "auditor"; "invoke simple chat"; "invoke conversation (multimedia)"; set disposition"; and "get customer journey".

Further, as also illustrated in FIG. 7 and in accordance with an exemplary embodiment, the microservices may be depicted in a honeycomb-type hexagonal pattern. In this manner, the analyzing of a particular interaction effectively breaks up the associated tasks into relatively small pieces that correspond to different microservices. In an exemplary embodiment, a cloud native microservices-based implementation, such as Apache Kafka, is used, and in this construct, the honeycombs communicate with one other via events. The use of such an implementation provides several advantages, including the following: 1) Events must arrive in the proper order and must be scalable. 2) By partitioning the interactions, there is a low latency with respect to increasing or decreasing the number of microservices to be used (further noting that lower processing latency may be achieved by increasing the number of microservice instances). 3) By virtue of the ordering and the scalability of events, the interaction services handling module 302 achieves a higher throughput, thereby speeding up processing 4) Load balancing and caching of IP addresses also contributes to higher processing speeds. 5) The ability to identify multiple redundancies in connections between microservices provides system resiliency and robustness. In an exemplary embodiment, events relating to a specific user session must be consumed in exactly the same order as the events were produced. Events relating to multiple user sessions need not be consumed, relative to each other, in the order in which they were produced. Distinguishing between events relating to a specific user session and events relating to multiple user sessions in this manner may facilitate a greater parallel processing capacity.

At step S416, the interaction services routing and handling module 302 receives response information that relates to a respective response for each corresponding request. In this aspect, in many situations, the received response effectively concludes the interaction.

In an exemplary embodiment, a cloud native microservice approach for an omni-channel contact center is provided. This approach includes decomposed contract based microservices and a microservices-based event-driven architecture that resides in the cloud and is designed to have an elastic scale, high availability, and high resiliency, with a service level agreement (SLA) that is higher than 99.999%. The contact center is a real time (millisecond, sub-second latency) architecture that has an extensive intrinsic design Groups of microservices are created in order to provide different aspects of functionality. The stack includes a platform as a service (i.e., microservices platform, such as, for example, Kubernetes or Cloud Foundry), Kafka scalable event messaging and streaming technology, Cassandra, NoSQL performant private database for microservices, and distributed in-memory grid technologies such as, for example, Cloud Cache, for storing quickly accessible state information.

The general architecture includes a facade layer of microservices adapting to external monolith application elements through predetermined protocols, and normalizing the communication to fit a highly available, concurrent processing, resilient, large-scale, event-based communication; Kafka Topics for ordered events to consuming instances of microservices; client-facing microservices which consume raw Kafka events from façade microservices and provide discrete functional services with a client-facing application programming interface (API)—RESTful Web Services, a general purpose notification service that provides a bidirectional low latency event exchange mechanism between clients (e.g., single user web clients) or server applications (e.g., fraud ecosystems, voice biometric systems, analytics, and/or recording systems); web clients following microservices architecture with user interface (UI), software development kit (SDK), and Services architecture using Angular8 frameworks; drop-in concept for specialist phone control applications into various servicing applications delivering a computer telephony integration (CTI) container with all of the functionality included therein; programmatic APIs for screen pop; and standalone ribbon. Clusters of microservices are provided for core servicing fabric telephony and agent login; automated specialist provisioning across multiple monolith application solutions for orchestration, routing, recording, voicemail, and other functionalities; specialist phone control; and real-time dashboard for contact center supervisory personnel.

In another exemplary embodiment, a client ribbon embedding mechanism that is suitable for a large scale deployment and integration with key value pairs (KVPs) for screen pops is provided. The client ribbon embedding mechanism includes a self-contained feature set that is extensible to omni-channel without requiring extensive deployment and knowledge of CTI protocols and APIs by non-contact center developers. The mechanism creates a lightweight approach to integrating contact center specialist features into the servicing application, thereby providing a quicker rollout, reduced integration effort, and automatic updates for easier maintenance. The mechanism includes standardized integration patterns and a cookbook recipe approach, and provides a way to obtain integrated features required by servicing applications. These features may include: screen pops; updating customer relevant data; end call tracking; state change tied to case disposition; transfer and conference events; customized call notifications, and enabling key value observers (KVOs) to be updated by servicing applications, middleware, and fraud authentication systems.

In yet another exemplary embodiment, a Kafka usage for converting stateful ordered events to stateless, scalable eventing in real time is provided. The design includes concurrent data-center (DC) and pool-specific active and backup topics on multiple Kafka clusters in order to handle catastrophic pool failures. In an exemplary embodiment, a pool refers to an instance of the cloud platform so that multiple pools within a DC provide resiliency in the event of a failure of a single pool (e.g., a bad network router). In the present disclosure, a "pool" is equivalent to an Availability Zone (AZ) within a DC, and as such, the terms "pool" and "AZ" are used interchangeably herein. Other features include cross-DC Kafka events to provide a telephony service that is abstracted from an affinity to one of many DC's. The use of a Kafka routing key that is tied to directory numbers (DNs) and design in partitioning may also be provided, in order to cause ordered events to go to particular consumers in a scalable manner. A sticky Kafka partition assignor to reduce latencies when the cloud system automatically scales up or down may also be provided, for overcoming a need to rebalance and/or resend on multiple hops that may otherwise introduce latencies. A sequential thread executor may also be provided to distinguish between events that may be processed in parallel from those that must be processed sequentially.

The Kafka usage may include a sticky pool-aware Kafka partition assignor to enable a cloud system to automatically scale up or down despite pool affinities, which require each message to be processed by an instance within that pool that would otherwise fail or be inefficient outside of that pool. The sticky pool-aware Kafka partition assignor is designed to minimize churn while allowing an application to reserve a partition in order to avoid any impact while scaling up. The sticky pool-aware Kafka partition assignor may also cause partitions to stick to respective pools so that affinities to each pool are unaffected during rebalancing.

The Kafka usage may also provide for handling affinities at the edge of the cloud where only one instance can process a particular message but Kafka has only crude routing capabilities. In this aspect, a microservice instance with an affinity, such as, for example, a web-socket to a specific client, supplies the client with a subscriptionId that happens to also be a Kafka routing key that guarantees that all messages sent to that client from back end services arrive, within a single hop, at the correct microservice instance. The microservice had previously reserved a partition, calculated as at least one universally unique identifier (UUID) that routes to the partition, so that the UUID(s) can be offered on demand to clients as subscription IDs.

The Kafka usage may also provide for multi-threading of the consumption of messages per Kafka partition while maintaining strict message ordering. In this aspect, for the vast majority of microservices, ordering only has meaning for messages produced with the same routing-key. Thus, the Kafka usage may be designed to process all messages received from a partition in parallel except for those messages with the same key which must be processed sequentially.

In still another exemplary embodiment, resiliency patterns and a client discovery service designed to overcome global load balancer (GLB) latencies is provided. Browsers and client desktops cache domain name system (DNS) resolution of uniform resource locators (URLs), and when the backend services or pools experience failures, the clients continue to attempt to generate requests to the same defunct destination. In such deployments, where no performant IP sprayers or gateways exist and where millisecond latency SLAs exit, there may be a disruption in the continuous availability of services. In this aspect, a client side resiliency that complements the multi-pool, multi-instance, and multi-data center availability for instant seamless connection is provided. The client first discovers services and capabilities, including backup pool URLs, according to current availability and user authorization. The discovery service provides intelligent backup URLs for stateful services, stateless services, and external server systems A client software development kit abstracts the resiliency, rehydration, and reconnection logic, begins network recovery, and then does a seamless login. The client user interface automatically recovers from the loss of a websocket or failure of a cloud microservice in a pool.

In yet another exemplary embodiment, resiliency patterns and seamless resiliency of stateful, low latency telephony clients across multiple data centers (DCs). In each data center, stateful edge services monitor each extension (i.e., domain name) simultaneously from different instances on both pools, thereby providing both instance and pool resiliency Such services may use a de-duper that receives events from both pools but propagates only one pool. For phone resiliency, extension (domain name) may move from one data center to another, and the servicing fabric in both data centers may detect the move and direct requests to the new data center. Failure to login causes a resynchronization of the phone state in both data centers, thus self-healing in case discovery becomes out of synchronization.

The following table provides a list of features and specific aspects thereof:

| | | | | |
|---|---|---|---|---|
| Stateful Domain | Stateful→Stateless | Bidirectional WebSocket | Dealing with Vendor Egress High Affinity connections | Follow the Phone - DR failover |
| Low Latency | Minimize Latencies through colocation | Select Blazing fact Technologies | Highly concurrent connections: vendor systems & clients | Custom Sticky Kafka Partitioner |
| Stack HA | Provide HA of CaaS, Kafka clusters under the cover | Leverage nascent resiliency in stack | Event Starters encapsulate HA | Belleville DC Promotion |
| Load Balancing | Client Side Recovery (WS disconnect, Pool failure, app failure) | Connection to GLBS for Config and Stat servers | Phone and queue monitoring load balanced across a DC | Data extractions load balanced across DCs |

| | | | | |
|---|---|---|---|---|
| Black Pool Failure | Client Side Recovery (WS disconnect, Pool failure, app failure) | Kafka moves all load to other pool < 3 sec | Subscriptions replicated across pools | SDK connects to other pool |
| Grey Pool Failure | Sticky Partitioner isolates n/w issues in pools | Multiple Layers of defense for grey failures | OAUTH2 Authorization across multi pool env | Cloud Config Server has all the bootstrap info Prod: Bitbucket |

In still another exemplary embodiment, defense mechanisms for handling grey failures in the cloud are provided. A first defense mechanism is a sticky partitioner that is designed to handle a scenario in which one pool is bad, and even while sharing the same Kafka and Cassandra across two pools, events would zigzag across microservices in the two pool, thereby increasing the probability of a grey failure when any microservice in a second pool begins to go bad, and also affecting all traffic. The sticky partitioner addresses this scenario by isolating network issues in pools by primarily routing the events to the same pool, thereby ensuring that 50% of the traffic is not affected by an unhealthy grey pool.

A second defense mechanism is the use of multiple levels of defense for grey failures so that a single failure does not equate to a request failure as it is retried across other pools and/or other mechanisms. For example, for a scenario in which an external server application issues a request to a pool that is only partially able to service the request, thereby resulting in a failure, this defense mechanism is designed to propagate all information available for servicing the request in a second attempt on another pool. If the second pool is able to find the remaining missing data from the first pool, then the second pool processes the request.

A third defense mechanism is the use of multiple layers of defense for grey failures for stateful microservices so that a single failure does not equate to a request failure as there are multiple resiliency designs at each stage of the microservice in order to ensure servicing the request. For example, for a scenario in which a ribbon login fails because a CTI extension monitoring had failed or was interrupted, or because the request was routed to the wrong pool, or because the domain name is not in service, this defense mechanism is designed to perform several functions, including the following: CTI monitors domain name changes at all times; domain name in-service and out-of-service events are propagated across both data centers; if the login attempt comes to a data center where the domain name is out of service, CTI will ask the other data center's CTI to publish if the domain name is in service in that data center; repeat a set up from scratch for failed connections for some CTI domain names; delegate some failed connections for some CTI domain names from one CTI to a backup CTI; and recovery code in ribbon client to go into retry mode and determine when the domain name status changes, thereby self-healing.

In yet another exemplary embodiment, high efficiency reliable bidirectional messaging for low latency microservices is provided. This embodiment includes several features. A first feature is an ability to send a Kafka event direct to the instance hosting the web-socket for the final leg of delivery with a minimum possible latency. This is achieved by calculating a UUID that maps to a partition owned by the notification-service instance so that all messages sent using that UUID as a Kafka routing key are delivered directly to the correct one of many notification-service instances.

A second feature is an ability to scale up a number of instances without any latency nor disruption to existing web-socket users. This is achieved by using a custom stick partition assignor whereby the consumer is guaranteed that one partition is never removed. This also avoids two-hop routing.

A third feature is load balancing of system-wide events to another ecosystem through stateless, load balanced, randomized delivery on any of the web-sockets (WS) This feature provides an ability to load-balance events that can be consumed by a group of web-socket clients. This is achieved by allowing each member of a load-balancing (LB) group to subscribe with the name of the LB group so that future messages received by a notification service on a UUID that belongs to the group can be delivered to any member.

A fourth feature allows for more than one web-socket to be part of a high availability (HA) group to ensure low latency and guaranteed delivery on a surviving web-socket. This feature provides an ability to support clients that require a highly available pair of web-sockets where ordered events are delivered via an "active web-socket" only, and when it fails, the surviving web-socket is immediately promoted to being active. Thus, a latency that would have occurred without the HA group is completely avoided. Meanwhile, the client will initiate a new backup web-socket. To protect against failure or down-scaling, upon receiving a new web-socket request with an HA group identification, the corresponding notification service will reject a request to create a second web-socket in the same HA group on the same instance.

A fifth feature provides an ability to support message delivery from clients in multiple pools. This is achieved by using Kafka's native ability to route messages using a routing key so that the producer of the message only needs to know the Kafka cluster address.

A sixth feature provides an ability to subscribe anywhere, replicate everywhere, and notify anywhere. This feature further provides an ability to support message delivery from clients in multiple data centers (DCs) whereby when a message is received in one DC where the UUID is not recognized, the notification service will query a database to determine the Kafka duster associated with the UUID so that the message is delivered in a second hop. In this manner, the client need not be concerned with the DC affinity of the web-socket.

A seventh feature provides an ability to act as a durable message provider by which no messages are lost. This feature further provides an ability to cache events in case a client is temporarily absent, providing a fire and forget service for microservices. This is achieved by caching undeliverable events for a configurable amount of time after a web-socket disconnects. On reconnection, the client will present, via a web-socket message, an identifier that maps it to the previously used UUID, and the notification service will then deliver all cached messages before continuing with normal message delivery.

An eighth feature provides a client side preferred data center, which allows clients to receive events more quickly by directing them to a more efficient pool. The efficiency is improved through locality, speedier delivery of events for co-located microservices, and Kafka, together with monolith application gear for a particular user. A client side preferred availability zone, within a DC, allows clients to avoid additional synchronization that would arise if a request is made from any availability zone other than the home or preferred availability zone. Then that request involves multiple hops to other microservices ending in a response that would need to be propagated to the client. The preferred availability zone means the availability zone to which events are naturally routed based on the Kafka routing key used to send messages regarding a given user.

A ninth feature provides a common utility framework to notify any client independent of any type of microservices (i.e., a sender of an event). The common utility framework manages the client notification channel and is a common utility for services, thus abstracting them from the delivery details.

A tenth feature provides client session management via termination lifecycle events, which are being sent to all microservices. An eleventh feature provides abstracting of the Kafka resiliency architecture (e.g., dual DC or standby DC) via a mere web-socket delivery.

Taken together, these features provide additional advantages, including the following: First, ribbon clients were preferred not to talk to Kafka because it would require a partition for each user, but an excessive number of partitions would not be supported by Kafka, because of a lack of scalability, or else users would receive events that were intended for other users. Second, web-sockets are used for low latency, but the present embodiment uses a common web-socket towards a client, and routes all events from various microservices on the same channel.

The following table provides a listing of front-end microservices and descriptions thereof:

| Front-End Microservice Name | Description |
| --- | --- |
| Call | Make, end, hold, mute, conference, transfer |
| Discovery | Provides sets of URLs indicating the optimal location of a front-end service for a given user |
| Notification | Consumes from front-end services and delivers messages to clients via web-socket |
| Operating Profile | Provides the telephony profile template that can be applied to a specialist such as ability to make a long distance or international call, call recording percentage and retention duration, etc. |
| Participant Profile | The complete listing of all configuration & permissions settings for a specialist - encompassing business function parameters, speed dial lists, Voice biometric, settings, shared voicemail settings, skills and proficiency levels, operating profile parameters, ribbon presentation parameters |
| Presence | Allows the client to obtain real time queue metrics such as oldest call waiting, numbers of calls in queue, service level agreement percentage, and agent metrics such as Number of agents ready, number of agents in After Call Work (ACW) state, longest ACW agent, etc. |
| Ribbon | Provides the Front End web UI that acts like a phone control UI that controls the contact center hard/soft phone; allows agent to login, change state to ready/lunch/after call work, and answer incoming calls, see the screen pops with associated servicing applications, initiate a consultation and conduct a warm transfer or conference, use speed dials, and look at real time queue statistics. |
| External Config | Obtain configuration from routing layer such as Virtual queues and speed dials |
| Stats-Aggregation | Provides an API and events to a UI used by contact center leaders to obtain aggregated metrics across a set of specialists and queues |
| Team-Management | Provides an API and events to a UI or any system with the contact center hierarchy for a given specialist |
| User-Status | Provides APIs to change status of a specialist such as Login, Logout (across all channels administered for the user) and change status (Lunch, Training, After call work and Ready) |
| Voicemail | Provides APIs and events for notification of voicemails and any change in voicemails (new, message has been read or deleted) |

Back-end (BE) microservices provide a service to one or more front-end services, by abstracting the front-end service from legacy/non-cloud systems. The latter present scaling, resiliency, authentication challenges that require unique adaptation in order to exchange data to/from the cloud.

The following table provides a listing of back-end microservices and descriptions thereof:

| Back-end Microservice Name | Description |
| --- | --- |
| Computer Telephony Interface (CTI) | Abstracts Call-Service from the Computer Telephony interface API provided by a legacy system with hard user-to-server affinity |

| Back-end Microservice Name | Description |
| --- | --- |
| CTI-dedupe | Eliminate duplicates to provide a highly-available stream of events from a non-highly-available event-source. |
| Stats Adapter Unity-Voicemail | Adapts to a non-cloud system for providing voicemail alerts |

In an exemplary embodiment, a process for handling large number of customer service interactions to ensure efficient and accurate interaction servicing results conforms with one or more of the following qualifications:
1) Microservice instances are capable of being destroyed without any warning, without any loss of data and with minimal delay (i.e., on the order of milliseconds) in processing of events.
2) Microservice instances are capable of being scaled up and down at any time without any warning, without any loss of data and with minimal delay in processing of events.
3) Exact ordering of related events is maintained during the end-to-end publishing and consumption sequences as these events flow into and out of the system.
4) There is no single point of failure, even with the loss of an availability zone or a data center.
5) Latency in ingress to egress is minimized.
6) Microservices are decoupled.
7) Design challenges in a microservice do not become a challenge to client microservices.
8) Microservices continuously check their availability to provide a service and on failure are excluded from route selection.

Figure 8:
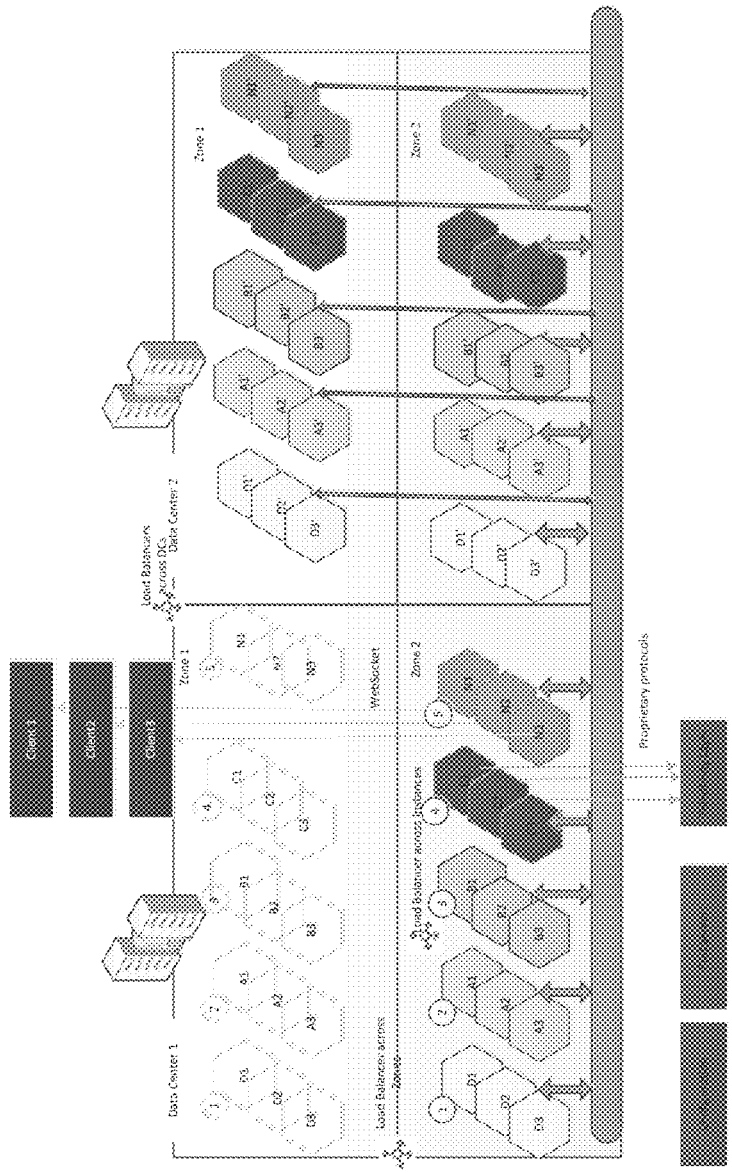
FIG. 8 is a diagram that illustrates multiple clients connecting to microservices invoking different operations through load balancers services available in multiple data centers, each having multiple zones which have multiple instances of any microservice type, according to an exemplary embodiment.

FIG. 8 is a diagram 800 that illustrates multiple clients connecting to microservices invoking different operations through load balancers services available in multiple data centers, each having multiple zones which have multiple instances of any microservice type, according to an exemplary embodiment.

Referring to FIG. 8, also illustrated is a messaging bus (e.g., a bus similar to Kafka) that allows microservices to publish events on topics and for these events to be independently consumed by other microservices. Back-end microservices obtain events from the telephony layer through proprietary protocols (e.g., C) and then normalize these events before triggering a publish/consume/process sequence with other microservices, and this is then repeated multiple times to form a choreography of events. Ultimately, events reach end-user clients over websocket connections hosted by a microservice (e.g., N1) that consumes messages from the bus and delivers each to one of many clients hosted from one of many of its microservice instances. The publish/consume/process sequence can be repeated multiple times to flow from ingress to egress. For example, an incoming call may result in C1 receiving an event from an external monolith application server and then publishing the event towards B1, B1 to A1, A1 to N1 where a JSON message is sent over a websocket from N1 to the specific user's ribbon client that needs to receive that particular message.

Referring to FIG. 8, the following is a list of design choices that may be made and a resulting algorithm for optimal routing and to provide maximum resiliency:
1) Identify non-stateful services to be accessible through global fully qualified domain name (FQDN) (i.e., in any of the pools, and in any data center). These services are immediately scalable and resilient because any instance can process any event.
2) Identify soft-state services and make them effectively stateless by distributing state in highly available external data stores or in-memory grids. For example, a model of a call is created in the call microservice but the data is distributed. When the model of the call is required later, the call model is fetched, possibly updated and re-distributed. The result is that any instance can process any event and the loss of any instance does not cause a loss of data or service.
3) Identify hard-state services and make them scalable and resilient to failure Example 1: Notification Service has a hard-state because only one instance has a websocket connection to a given client. All messages for this client must be processed by the one-and-only instance that has the websocket. Example 2: Legacy devices that act as an event source to the cloud are not capable of load-balancing events among a set of clients that register as a group for all events Each CTI service instance must create a connection to legacy devices and register interest for a subset of all users so that each instance receives events for that subset only, and each instance ends up processing events in inverse proportion to the number of instances.

A first design choice is to maintain strict event ordering with multiple threaded microservices, multiple instances, and multiple availability zones. First, add a timestamp to each event and route related events to the same upstream instance and processed in a single thread per route partition. Second, all related messages are produced with the same routing key and processed using multi-threads per route partition.

A second design is to handle a loss of an availability zone without any loss of data One solution is for each availability zone (AZ) processes all of the events in a data center (DC) and ensures that only one AZ delivers events to the client. This requires that each AZ has enough resources to process the entire DC load and requires more resources because of the duplication. Second, each AZ load-balances among all other AZ's in the Data Center and on loss of an AZ, the other AZ's take over the work load without any loss of data.

A third design choice is to handle a grey failure of an availability zone. First, identify the unhealthy AZ and stop it. Second, ensure that all events within an AZ stay within the AZ, i.e., avoid zigzagging between AZ's as events flow from ingress to egress.

A fourth design choice is to solve the "publish-to" affinity issue at the notification service. First, aggregate all events in a distributed cache. Second, consume events where needed Each instance is to consume only its own events without intelligent co-operation of the message publisher in a single step.

A fifth design choice is to solve the "consume-from" affinity issue in the CTI service. For each instance of the microservice, an algorithm creates a subset of the entire set of users to be monitored. Create two tiers (primary & backup) of CTI microservice where both tiers monitor each subset independently from different AZs. The backup consumes the output of the primary and produces events only on failure of the primary. Then, each user is to be monitored from two or more availability zones. All events for the same user are to be routed to the same instance of a de-duping service. The de-dupe service is to propagate from the AZ that processed the last request.

A first solution relates to data center resiliency. On losing service to a data center (DC), the Ribbon software development kit (SDK) triggers an automatic recovery using the set of URLs provided by the Discovery Service to restore service at an alternate DC. The Discovery Service uses a replicated database to provide a view of resources from all Data Centers. The Discovery Service itself is accessed via a Global Load Balancer (GLB) which monitors the health of all services. When a service-instance in a DC is lost, including Discovery itself, the GLB automatically removes that instance from the list of locations at which the service is available.

A second solution relates to pool resiliency. Each Data Center may have multiple Availability Zones, or pools, so that service continues from that DC if any pool is lost. In normal operation, each pool load-balances the entire DC workload with all other operating pools. If a pool fails, or if all instances of a given service fail, then the load is automatically and immediately transferred to surviving pools. A mechanism to achieve rapid detection and amelioration is to use Kafka rebalancing Kafka has/needs no knowledge of pools, it merely sees all instances of a microservice in all pools as peers of each other. When an instance becomes unreachable, then Kafka allocates the partitions that the instance used to own to the least-loaded surviving instance.

The above assumes the ideal case of stateless cloud services whereby any instance in any pool can process any work. This requires that any state derived from previous transactions be available to the new instance. This may be achieved using an inter-pool or inter-DC replicated database. However, given that database replication is not instantaneous, microservices may require transactional processing whereby each new transaction has a reference to a previous transaction that must be completed before processing of the new transaction can begin.

A third solution relates to microservice resiliency. Each microservice instance can fail or be killed by a scale-down operation at any time Mechanisms are required to identify an instance that is malfunctioning due to an internal bug (e.g., a memory-leak or a stuck thread) or because a downstream resource has become unavailable or is malfunctioning. Regarding handling of critical errors: Upon encountering a critical error such as loss of all connectivity to downstream dependencies, the microservice will begin a self-destruct timer which, upon expiry, will self-terminate if the error condition has not cleared. In the meantime, the microservice will return an unhealthy response to external health checks so that the instance is immediately removed from the list of instances providing the service.

Regarding an internal audit: The next safeguard for detection of error conditions is a scheduled audit which identifies anomalies. The audit may implement one or more of the following: 1) Persist the results of previous audits (including timestamps) so that the duration of an error condition is known; 2) Verify connectivity to, and service from, downstream services so that even when there is no system traffic, a failure of the downstream service is detected; and 3) Update the internal health status to unhealthy or as a reduction in the percentage of health.

The next safeguard for detection of error conditions is an external audit. The external audit may be trigged by any of the Cloud Platform, the GLB, and/or a dedicated Health checking service such as Eureka. An audit may verify that the process is running or that a connection can be opened to the service, but the most effective audits either verify that the service is actually working using a real API with dummy resources or by querying the service's internal determination of its own health.

Graceful shutdown: If shutdown is initiated for any reason (e.g. internal audit failure or by a system scale-down), the microservice should attempt to stop gracefully so that upstream microservices are immediately informed and do not have to rely on resiliency timers to consider it to be unhealthy. If transactional processing, no new transactions should be started during the shutdown phase and all in-flight transactions should be completed normally. If not using transactional processing, then pause consumption of new work, complete the work, inform the message bus of the stoppage so that resources are reallocated to surviving instances, and close resources. The "pause" phase is necessary to ensure that all events are processed in the correct order and to ensure that the same event is not processed by both old and new instances.

Regarding minimization of latency: The most effective ways to minimize latency include the following 1) Minimize the number of hops as work flows from the client to the back-end and back again; 2) Minimize the time to retrieve persisted state; 3) Dynamically scale up the number of instances to apply more CPU's to the given workload; 4) Aggregate the work where possible; and 5) Minimize synchronization in multi-threading microservices.

Regarding minimizing the number of hops: The main trade-off cost of breaking up an application into microservices is the increase in latency caused by the need to propagate work through the chain of microservices. Therefore, applications requiring low latency must by design involve no more than two or three hops before executing the request.

Example 1: Avoid hops to solve non-cloud affinity. Whereas it is possible for microservices to route requests to the DC or pool best suited to processing that request, a better solution, with one fewer hop, is to provide clients with a Discovery Service that provides a ordered list of URLs, ranked in order of preference where latency is a key factor in the ranking. For example, where non-cloud systems require that a request for a given user can only be executed at one location, the Discovery Service must return the "Home Pool" URL for the given service Discovery Service leans of the Home Pool for a given user at system initialization where backend services publish the service that they provide per user. Front end services consume this information and publish their claim to be responsible for providing the service to the given user.

Example 2: Avoid hops to solve client affinity. Ribbon SDK receives events from Front end services via a websocket hosted from Notification Service. Front-End services send messages to Ribbon via Notification Service. Even though only one instance of Notification will have a websocket to the Ribbon SDK, the following avoids the need for multiple hops without requiring front-end services to track the correct Notification instance before sending the message, and/or for Notification to resolve the client affinity problem itself using a lookup with a second hop to the correct issue. Each instance supplies the clients of the service with a UUID that automatically routes back to itself.

The most effective way to minimize time to retrieve persisted state is to perform the following 1) Cache the data from previous recent transactions in memory with a TTL=min-failover-time; 2) Additionally, write-behind to a persistence store; 3) Message bus to consistently route messages involving a given user to the same instance (unless the instance fails or scale up) resulting in a guarantee that this instance will always have the latest data for that user; and 4) Read from in-memory or fall back to reading from persistence. If an instance fails or scale up occurs, a new instance may become responsible for a given user and on not finding the data in the in-memory cache, will fall back to reading from persistence.

Regarding dynamically scaling the number of instances: Increasing the number of instances of an application increases the potential to spread the workload over a larger number of CPUs, thereby reducing the probability of work being queued behind other work and increasing the probability of a thread being available to process the word as soon as it is consumed.

Regarding aggregating the work: Where possible, requests that always involve a series of steps should be aggregated into a single request. For example, steps 'login' and 'change to work state Ready' should be performed in a single transaction. Both steps should produce separate state-changed events such as UserLoggedIn and UserWorkStateChangedReady so that upstream clients can track progress and failure in the second step can be handled separately.

Regarding minimizing synchronization in multi-threading microservices: Although synchronizing access to a resource has the effect of guarding against multiple threads acting on the same user resource, this increases complexity and causes blocked threads and higher thread-context-switching. The architecture of the end-to-end system avoids these issues by minimizing synchronization. User related events are produced using a user-id as the message routing key. Messages with the same routing key are guaranteed to be processed in-order and sequentially. When a multi-threaded instance receives two messages for the same user, the need for synchronization in the microservice is avoided because only one thread can process a task for the given user.

The following is a holistic outline for an algorithm for a cloud native Contact Center.
1) Configure non-stateful services to be accessible through global fully qualified domain name (FQDN) (any of the pools, in any DC) and resilient to any type of failure Discovery Service returns Global GLB URL to clients.
2) Soft-state services store call context, subscriptions in memory grids available to more than one instance, thereby making them stateless and impervious to any type of failure.

Hard-state services like Notification or CTI use particular routing keys to make them scalable and resilient to failure. Example 1. Notification Service has a hard-state because only one instance has a websocket connection to a given client. Example 2: WSS Extract—Distributing the extract to parallel instances that then each extract that organization's hierarchy, resiliency is achieved with time-to-live (TTL) in Cassandra, when an instance dies, another instance self-elects (has to win the race) to take over that organization for extraction.

Example 3: When the CTI microservices first come up, instance zero (0) starts first and mines the DNs and then distributes them to the available partitions and each instance picks up the partitions and the DN range assigned to those partitions. The events for those DNs will be routed to the instance that has been assigned the partition Resiliency Scenario: When an instance dies, Kafka will automatically reassign the partition to another surviving instance, which will automatically start receiving the events for the DN. This reassignment will work even if multiple instances or all instances of the microservice die in one pool; the other instances of the same microservice running in another pool will naturally pick up the traffic and handle it. As new instances become automatically created, the reassignment can happen again.

To accommodate the strict ordering that telephony requires and yet be scalable, a single Kafka topic is designed to carry different events where the time sequence ordering must be maintained. Leveraging the fact that Kafka protects the ordering within any partition, the key to solving this is to consistently use the same (e.g., DN/User-Id/session-id) unique routing key for all related events so that they are routed to the same partition.

The routing key's partition assignment is derived from a hash and modulo algorithm that ensures equal balancing of DNs across the partitions despite the DN numbering/dial plan. For a fixed number of partitions, a given routing key maps deterministically to the same partition using a hash and modulo algorithm that ensures equal balancing of DNs across the partitions despite nonrandomness in the DN numbering/dial plan.

Pre-cloud legacy monolith systems do not have resilient DN-load-balanced HTTP friendly Webservice APIs. In addition, they will follow a resiliency model that has a primary backup design which forces knowledge on monitoring and connecting a DN that is connecting to the active system. Each system may also have a primary/backup local resiliency model that requires clients (in this case microservices) to track its connection and re-register if for any reason the primary goes down. This creates a lot of sticky affinity and stateful knowledge in the connections to monolith applications, with proprietary protocols that do not easily provide failover intrinsically. To overcome this, the design is to push this awareness to the edges of the microservice choreography and also maintain a dual connection to both primary and back up monolith applications at all times. This ensures an always available connection, and without losing events during failure scenarios or without experiencing latency while shifting from primary to backup, there is a steady and continuous stream of events. In other cases of resiliency, the microservice connecting to the monolith application itself may undergo failure, and hence there are two microservice instances at any time connecting to the monolith applications. The cost of this resiliency, however, is that only one of duplicate set of events need be selected.

Minimize latencies using Discovery Service to route clients to the Cloud services that are physically closest to the legacy system to minimize network latencies. The system detects which is the preferred and which is the business continuity DC (and hence pools) for each DN, and Discovery Service caches this preference so that it can return the URLs to the client. This will ensure automatic load balancing with scaling up number of instances. Resiliency Scenario for instance or pool failure also allows resiliency to be automatically handled with Kafka rebalancing that reassigns partitions to surviving instances (consumers) when instances die within a pool or when an entire pool dies. Resiliency Scenario for both pools dying in a DC: When both pools die, a standby DC is started up to take over and connect to the DC's monolith application servers. Swap in new pools for the two that are unavailable in the DC.

Since each pool has an instance 0 of CTI, the same DN is being monitored on all pools, and the active DNs in a DC will receive events from the two pools in the DC. Resiliency Scenario when monolith applications fail over to another DC: When the DNs flip from preferred to business continuity DC (resiliency case), no extra code is needed, the other two pools suddenly start to receive events. When discovery service is notified that a DN has become active at a new location, it produces a DN-Migrated event to all DCs. The Ribbon connected to a different DC receives this event and provides it with an option to avail of service(s) from the new location. This way, the ribbon will connect to N1' and start receiving the DN's events.

In order to be efficient with memory, central processing unit (cpu) capacity, and scale easier, the duplication of events and its processing is de-duplicated at the earliest opportunity within a DC This design choice requires de-duplication, i.e., discarding of a duplicate event. Hence, a microservice CTI deduper is used to discard a duplicate event and only send one copy of the event to downstream microservices. Resiliency Scenario: If a CTI instance or entire pool fails, then the other pool's CTI instance provides the events to the deduper. There is no loss of events or delay in having the resiliency kick in, which meets the SLA of the stringent telephony domain.

Some events at the end of a choreographed sequence of processing by microservices end by sending an asynchronous event to the client.

Accordingly, with this technology, an optimized process for handling large number of customer service interactions to ensure efficient and accurate interaction servicing results is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for servicing a plurality of interactions with users, the method being implemented by at least one processor, the method comprising:
   creating, by the at least one processor, microservices;
   receiving, by the at least one processor from each respective user, a respective request for a corresponding interaction;
   obtaining, by the at least one processor for each interaction, request-specific information that relates to the received respective request and user-specific information that relates to the respective user;
   analyzing, by the at least one processor for each interaction, the request-specific information to determine, from the microservices, at least two corresponding microservices that are usable for handling the interaction;
   determining at least two separate routes having at least two different destinations that correspond to the determined at least two corresponding microservices;
   using at least one metric that relates to a workload distribution to select an optimum route from among the determined at least two separate routes;
   using the selected optimum route for routing the request-specific information and the user-specific information; and
   routing, by the at least one processor for each interaction, the request-specific information and the user-specific information to a respective destination that relates to at least one of the determined at least two corresponding microservices,
   wherein each respective user includes at least one from among a human and a machine that is configured to act on behalf of a human.

2. The method of claim 1, wherein the using of the at least one metric to select an optimum route comprises minimizing a number of microservice instances to be used along the selected optimum route.

3. The method of claim 1, wherein the routing further comprises maintaining an event ordering with respect to the selected optimum route.

4. The method of claim 1, wherein when at least one of the determined at least two separate routes becomes unavailable, the method further comprises selecting the optimum route from among the determined at least two separate routes that remain available.

5. The method of claim 1, wherein the routing further comprises avoiding a propagation of redundant events as events flow from ingress to egress.

6. The method of claim 1, further comprising receiving, by the at least one processor, response information that relates to a response to the respective request for the corresponding interaction.

7. The method of claim 1, further comprising displaying, by the at least processor for at least one interaction, a screen that includes at least a subset of the request-specific information, at least a subset of the user-specific information, and status information that relates to a status of the response to the respective request for the at least one interaction.

8. The method of claim 1, further comprising determining, for each interaction, a request type for each respective request, the request type including at least one from among a voice request, an email request, an online chat request, a browser request, and a click-to-call request.

9. The method of claim 1, wherein the method is implemented in a contact center environment, and the determined at least two corresponding microservices include at least two from among: a core servicing fabric telephony and agent login microservice; an automated specialist provisioning microservice for orchestration; an automated specialist provisioning microservice for routing; an automated specialist provisioning microservice for recording; an automated specialist provisioning microservice for voicemail; a specialist phone control microservice; and a real-time dashboard for contact center supervisory personnel microservice.

10. The method of claim 1, wherein the routing includes: utilizing a routing key to route, to the respective destination, the request-specific information and the user-specific information, wherein the respective destination comprises a cluster address.

11. A computing apparatus for servicing a plurality of interactions with users, the computing apparatus comprising:
   a processor;
   a memory; and
   a communication interface coupled to each of the processor and the memory,
   wherein the processor is configured to:
   creating, by the at least one processor, microservices;
   receive, from each respective user via the communication interface, a respective request for a corresponding interaction;
   obtain, for each interaction, request-specific information that relates to the received respective request and user-specific information that relates to the respective user;
   analyze, for each interaction, the request-specific information to determine, from the microservices, at least two corresponding microservices that are usable for handling the interaction;
   determine at least two separate routes having at least two different destinations that correspond to the determined at least two corresponding microservices;
   use at least one metric that relates to a workload distribution to select an optimum route from among the determined at least two separate routes;
   use the selected optimum route for routing the request-specific information and the user-specific information; and
   route, for each interaction, the request-specific information and the user-specific information to a respective destination that relates to at least one of the determined at least two corresponding microservices,
   wherein each respective user includes at least one from among a human and a machine configured to act on behalf of a human.

12. The computing apparatus of claim 11, wherein the processor is further configured to minimize a number of microservice instances to be used along the selected optimum route.

13. The computing apparatus of claim 11, wherein the processor is further configured to maintain an event ordering with respect to the selected optimum route.

14. The computing apparatus of claim 11, wherein when at least one of the determined at least two separate routes becomes unavailable, the processor is further configured to select the optimum route from among the determined at least two separate routes that remain available.

15. The computing apparatus of claim 11, wherein the processor is further configured to avoid a propagation of redundant events as events flow from ingress to egress.

16. The computing apparatus of claim 11, wherein the processor is further configured to receive response information that relates to a response to the respective request for the corresponding interaction.

17. The computing apparatus of claim 11, wherein the processor is further configured to display, for at least one interaction, a screen that includes at least a subset of the request-specific information, at least a subset of the user-specific information, and status information that relates to a status of the response to the respective request for the at least one interaction.

18. The computing apparatus of claim 11, wherein the processor is further configured to determine, for each interaction, a request type for each respective request, the request type including at least one from among a voice request, an email request, an online chat request, a browser request, and a click-to-call request.

19. The computing apparatus of claim 11, wherein the determined at least two corresponding microservices include at least two from among: a core servicing fabric telephony and agent login microservice; an automated specialist provisioning microservice for orchestration; an automated specialist provisioning microservice for routing; an automated specialist provisioning microservice for recording; an automated specialist provisioning microservice for voicemail; a specialist phone control microservice; and a real-time dashboard for supervisory personnel microservice.

20. The computing apparatus of claim 11, wherein the routing includes: utilizing a routing key to route, to the respective destination, the request-specific information and the user-specific information, wherein the respective destination comprises a cluster address.

\* \* \* \* \*